United States Patent
Nahavandi et al.

(10) Patent No.: US 11,890,242 B2
(45) Date of Patent: Feb. 6, 2024

(54) PATIENT SUPPORT APPARATUS INCLUDING A USER MODULE GENERATING STATE INDICATORS CORRESPONDING TO MONITORED CONDITIONS AND CHANGES THEREOF

(71) Applicant: Stryker Corporation, Kalamazoo, MI (US)

(72) Inventors: Kurosh Nahavandi, Portage, MI (US); Jeffrey Alan Kennedy, Kalamazoo, MI (US); Placide Nibakuze, Kalamazoo, MI (US); David James Buick, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 297 days.

(21) Appl. No.: 17/416,101

(22) PCT Filed: Dec. 19, 2019

(86) PCT No.: PCT/US2019/067397
§ 371 (c)(1),
(2) Date: Jun. 18, 2021

(87) PCT Pub. No.: WO2020/132194
PCT Pub. Date: Jun. 25, 2020

(65) Prior Publication Data
US 2022/0079823 A1 Mar. 17, 2022

Related U.S. Application Data
(60) Provisional application No. 62/783,305, filed on Dec. 21, 2018.

(51) Int. Cl.
*A61G 7/05* (2006.01)
*A61G 1/04* (2006.01)
(Continued)

(52) U.S. Cl.
CPC .............. *A61G 7/0524* (2016.11); *A61G 1/04* (2013.01); *A61G 5/10* (2013.01); *A61G 7/012* (2013.01);
(Continued)

(58) Field of Classification Search
CPC ........ A61G 1/04; A61G 5/10; A61G 2205/50; G05B 19/02; G05B 19/05
(Continued)

(56) References Cited

U.S. PATENT DOCUMENTS 6,560,492 B2 * 5/2003 Borders ................. A61G 13/08
700/83
8,689,376 B2 4/2014 Becker et al.
(Continued)

FOREIGN PATENT DOCUMENTS

EP 2702972 A2 3/2014
EP 3162346 A1 5/2017
(Continued)

OTHER PUBLICATIONS

Hill-Rom, "Centrella Smart + Bed Brochure", Sep. 28, 2017, 11 pages.
International Search Report for Application No. PCT/US2019/067397 dated Sep. 4, 2020, 3 pages.
(Continued)

*Primary Examiner* — Md Azad
(74) *Attorney, Agent, or Firm* — Howard & Howard Attorneys PLLC

(57) ABSTRACT

A patient support apparatus comprises a support structure, a user module, and a controller. The user module comprises a display and indicator panel that has a plurality of indicia, each associated with a monitored condition. First light emitters are arranged to project light to illuminate the indicia and second light emitters are arranged to project light off a reflective surface. The controller is coupled to the display and the light emitters, and is configured to, in response to a (Continued)

change in a state of one of the monitored conditions, generate on the display a state indicator corresponding to the change in the state and activate the light emitters such that a color of the light projected by the light emitters matches a color of the state indicator.

18 Claims, 5 Drawing Sheets

(51) Int. Cl.
| | |
|---|---|
| A61G 5/10 | (2006.01) |
| A61G 7/012 | (2006.01) |
| A61G 7/10 | (2006.01) |
| G05B 19/02 | (2006.01) |
| G05B 19/05 | (2006.01) |

(52) U.S. Cl.
CPC ......... *A61G 7/0506* (2013.01); *A61G 7/0528* (2016.11); *A61G 7/1073* (2013.01); *G05B 19/02* (2013.01); *A61G 2203/12* (2013.01); *A61G 2203/20* (2013.01); *A61G 2203/30* (2013.01); *A61G 2205/50* (2013.01); *G05B 19/05* (2013.01)

(58) Field of Classification Search
USPC .......................................................... 700/17
See application file for complete search history.

(56) References Cited

U.S. PATENT DOCUMENTS

| 9,655,798 | B2 | 5/2017 | Zerhusen et al. | |
|---|---|---|---|---|
| 2006/0028350 | A1* | 2/2006 | Bhai | A61B 5/1115 177/144 |
| 2012/0025992 | A1* | 2/2012 | Tallent | G08B 21/22 340/573.4 |
| 2013/0007963 | A1* | 1/2013 | Tallent | A61B 5/1117 5/658 |
| 2013/0340168 | A1* | 12/2013 | Meyer | A61G 7/002 5/615 |
| 2014/0259410 | A1 | 9/2014 | Zerhusen et al. | |
| 2015/0187196 | A1* | 7/2015 | Blair | G16H 40/63 340/691.6 |
| 2016/0095774 | A1* | 4/2016 | Bobey | A61B 5/6891 5/658 |
| 2017/0124844 | A1* | 5/2017 | Huster | A61G 7/012 |
| 2017/0172829 | A1 | 6/2017 | Tessmer et al. | |
| 2017/0246065 | A1 | 8/2017 | Connell et al. | |
| 2023/0000700 | A1* | 1/2023 | Zerhusen | A61G 7/00 |

FOREIGN PATENT DOCUMENTS

| EP | 2437127 B1 | 4/2021 |
|---|---|---|
| WO | 2017093549 A1 | 6/2017 |

OTHER PUBLICATIONS

Stryker, "EPIC II Critical Care Bed Model 2030 Operations Manual", 2030-309-001 Rev A, Nov. 2007, 56 pages.
Stryker, "iBed Wireless Brochure", Jan. 25, 2018, Rev. B, 6 pages.

* cited by examiner

PATENT SUPPORT APPARATUS INCLUDING A USER MODULE GENERATING STATE INDICATORS CORRESPONDING TO MONITORED CONDITIONS AND CHANGES THEREOF

CROSS-REFERENCE TO RELATED APPLICATIONS

The subject patent application is the U.S. National Phase Application of International Patent Application No. PCT/US2019/067397, filed on Dec. 19, 2019 which, in turn, claims priority to and all the benefits of U.S. Provisional Patent Application No. 62/783,305 filed on Dec. 21, 2018, the disclosures of each of which are hereby incorporated by reference in their entirety.

BACKGROUND

Patient support apparatuses such as hospital beds, stretchers, cots, tables, wheelchairs, and chairs are routinely used to care for patients. Conventional patient support apparatuses comprise a base and a patient support surface, which supports the patient.

A typical patient support apparatus monitors several conditions of the patient support apparatus and/or the patient simultaneously and the states of these conditions need to be communicated to a caregiver effectively. The quicker and easier a caregiver can identify an issue, the better and more reliable the patient care. To this end, indicator lights may be employed by the patient support apparatus to assist in communicating the states of the monitored conditions to the caregiver. However, effectively and efficiently communicating the states of such monitored conditions with indicator lights remains a challenge.

A patient support apparatus designed to address one or more of the aforementioned challenges is desired.

SUMMARY

The present disclosure provides a patient support apparatus with a support structure having a patient support surface. A user interface is supported by the support structure and has a display. An indicator panel is provided, and has a plurality of indicia associated with monitored conditions. One or more first light emitters are arranged to project light to illuminate the indicia. A controller is coupled to the user interface and to the one or more first light emitters. The controller is configured to, in response to a change in a state of one of the monitored conditions, generate on the display a state indicator corresponding to the change in the state and activate the one or more first light emitters such that a color of the light projected by the one or more first light emitters matches a color of the state indicator.

The present disclosure also provides a patient support apparatus with a support structure having a patient support surface, and a reflective surface coupled to the support structure. A user interface is provided, and has a display supported for viewing by a user when adjacent to the support structure. One or more light emitters are arranged to project light against the reflective surface to illuminate the reflective surface in a reflected color so that the reflected color is viewable by a user remote from the support structure. A controller is coupled to the user interface and to the one or more light emitters. The controller is configured to, in response to a change in a state of one or more monitored conditions, generate on the display a state indicator corresponding to the change in the state and activate the one or more light emitters to indicate the change in the state.

The present disclosure also provides a patient support apparatus with a support structure having a patient support surface, a reflective surface coupled to the support structure, and a user module attached to the support structure. The user module comprises a user interface and an indicator panel. The indicator panel has a first indicium associated with a first monitored condition assigned a first priority, and a second indicium associated with a second monitored condition assigned a second priority different than the first priority. First light emitters are arranged to project light to illuminate the first indicium in a first color and to illuminate the second indicium in a second color different than the first color. One or more second light emitters are arranged to project light against the reflective surface to illuminate the reflective surface in a reflected color. A controller is coupled to the user module, and is configured to control the one or more second light emitters so that the reflected color matches one of the first and second colors based the assigned priorities.

Other features and advantages of the present disclosure will be readily appreciated, as the same becomes better understood, after reading the subsequent description taken in conjunction with the accompanying drawings.

DETAILED DESCRIPTION

Figure 1:
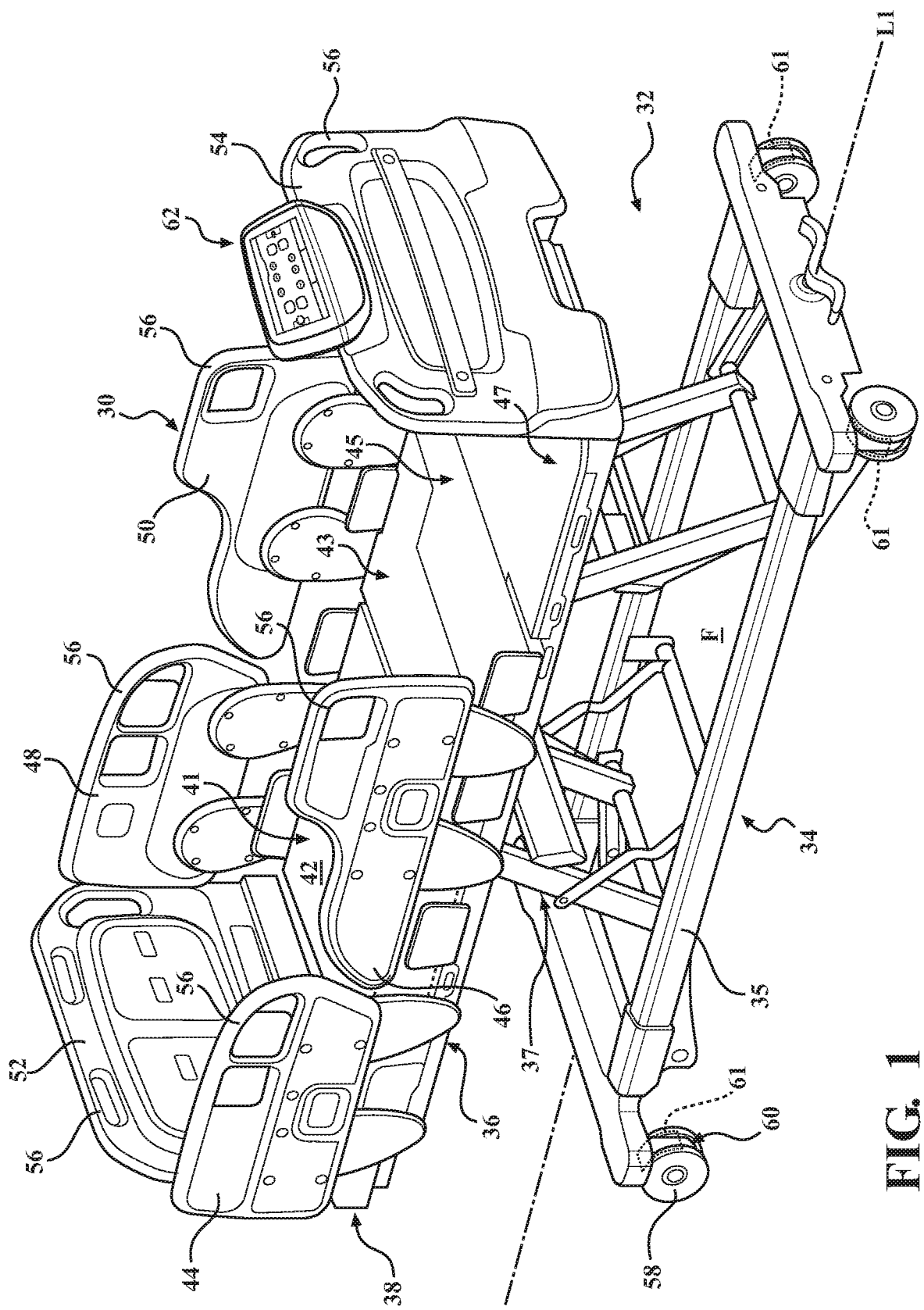
FIG. 1 is a perspective view of a patient support apparatus having a user module.

Referring to FIG. 1, a patient support apparatus 30 is shown for supporting a patient in a health care setting. The patient support apparatus 30 illustrated in FIG. 1 comprises a hospital bed. In other embodiments, however, the patient support apparatus 30 may comprise a stretcher, cot, table, wheelchair, chair, or similar apparatus utilized in the care of a patient.

A support structure 32 provides support for the patient. The support structure 32 illustrated in FIG. 1 comprises a base 34 and a support frame 36. The base 34 comprises a base frame 35. The support frame 36 is spaced above the base frame 35 in FIG. 1. The support structure 32 also comprises a patient support deck 38 disposed on the support frame 36. The patient support deck 38 comprises several sections, some of which are capable of articulating (e.g., pivoting) relative to the support frame 36, such as a back (fowler) section 41, a seat section 43, a leg section 45 and a foot section 47. The patient support deck 38 provides a patient support surface 42 upon which the patient is supported. A lift system 37 may be coupled to the support structure 32 to raise and lower the support frame 36, patient support deck 38, and patient support surface 42 to different heights relative to the base frame 35, including to a lowest height relative to the base frame 35. Such a lift system 37 may be like that described in U.S. Patent Application Pub.

No. 2017/0246065, filed on Feb. 22, 2017, entitled "Lift Assembly For Patient Support Apparatus," which is hereby incorporated herein by reference in its entirety.

A mattress (not shown) is disposed on the patient support deck 38 during use. The mattress comprises a secondary patient support surface upon which the patient is supported. The base 34, support frame 36, patient support deck 38, and patient support surface 42 each have a head end and a foot end corresponding to designated placement of the patient's head and feet on the patient support apparatus 30. The base 34 comprises a longitudinal axis L1 along its length from the head end to the foot end. The construction of the support structure 32 may take on any known or conventional design, and is not limited to that specifically set forth above. In addition, the mattress may be omitted in certain embodiments, such that the patient rests directly on the patient support surface 42.

Patient barriers, such as side rails 44, 46, 48, 50 are coupled to the support frame 36 and/or patient support deck 38 and are thereby supported by the base 34. A first side rail 44 is positioned at a right head end. A second side rail 46 is positioned at a right foot end. A third side rail 48 is positioned at a left head end. A fourth side rail 50 is positioned at a left foot end. In the embodiment shown, the head end side rails 44, 48 are mounted to the back section 41 for movement with the back section 41. The foot end side rails 46, 50 are mounted to the support frame 36 for movement with the support frame 36. If the patient support apparatus 30 is a stretcher or a cot, there may be fewer side rails. The side rails 44, 46, 48, 50 are movable relative to the back section 41/support frame 36 to a raised position in which the side rails 44, 46, 48, 50 block ingress and egress into and out of the patient support apparatus 30, one or more intermediate positions, and a lowered position in which the side rails 44, 46, 48, 50 are not an obstacle to such ingress and egress. In the embodiment shown, the side rails 44, 46, 48, 50 are connected to the back section 41 and/or the support frame 36 by pivotal support arms to form four bar linkages. Such side rails and the manner in which they may be raised/lowered are shown and described in U.S. Patent Application Pub. No. 2017/0172829, filed on Dec. 15, 2016 and entitled "Powered Side Rail For A Patient Support Apparatus," hereby incorporated by reference in its entirety.

A headboard 52 and a footboard 54 are coupled to the support frame 36. The headboard 52 and footboard 54 may be coupled to any location on the patient support apparatus 30, such as the support frame 36 or the base 34. In still other embodiments, the patient support apparatus 30 does not include the headboard 52 and/or the footboard 54.

Caregiver interfaces 56, such as handles, are shown integrated into the headboard 52, footboard 54, and side rails 44, 46, 48, 50 to facilitate movement of the patient support apparatus 30 over a floor surface F. Additional caregiver interfaces 56 may be integrated into other components of the patient support apparatus 30. The caregiver interfaces 56 are graspable by the caregiver to manipulate the patient support apparatus 30 for movement, to move the side rails 44, 46, 48, 50, and the like.

Other forms of the caregiver interface 56 are also contemplated. The caregiver interface 56 may comprise one or more handles coupled to the support frame 36. The caregiver interface 56 may simply be a surface on the patient support apparatus 30, which the caregiver logically applies force to cause movement of the patient support apparatus 30 in one or more directions, also referred to as a push location. This may comprise one or more surfaces on the support frame 36 or base 34. This could also comprise one or more surfaces on or adjacent to the headboard 52, footboard 54, and/or side rails 44, 46, 48, 50. In other embodiments, the caregiver interface 56 may comprise separate handles for each hand of the caregiver. For example, the caregiver interface 56 may comprise two handles.

Wheels 58 are coupled to the base 34 to facilitate transport over the floor surface F. The wheels 58 are arranged in each of four quadrants of the base 34 adjacent to corners of the base 34. In the embodiment shown, the wheels 58 are caster wheels able to rotate and swivel relative to the support structure 32 during transport. Each of the wheels 58 forms part of a caster assembly 60. Each caster assembly 60 is mounted to the base 34. Brakes 61 may be associated with one or more of the wheels 58 to arrest rotation of the wheels when active. The brakes 61 may be manually or electronically actuated. It should be understood that various configurations of the caster assemblies 60 and/or brakes 61 are contemplated. In addition, in some embodiments, the wheels 58 are not caster wheels and may be non-steerable, steerable, non-powered, powered, or combinations thereof. Additional wheels are also contemplated. For example, the patient support apparatus 30 may comprise four non-powered, non-steerable wheels, along with one or more powered wheels. In some cases, the patient support apparatus 30 may not include any wheels.

In other embodiments, one or more auxiliary wheels (powered or non-powered), which are movable between stowed positions and deployed positions, may be coupled to the support structure 32. In some cases, when these auxiliary wheels are located between caster assemblies 60 and contact the floor surface F in the deployed position, the auxiliary wheels cause two of the caster assemblies 60 to be lifted off the floor surface F, thereby shortening a wheel base of the patient support apparatus 30. A fifth wheel may also be arranged substantially in a center of the base 34.

Additionally, the patient support apparatus 30 may include one or more user modules 62 supported by the support structure 32 of the patient support apparatus 30. The user modules 62 may be disposed at the head end, the foot end, and/or on one or more sides of the patient support apparatus 30. More specifically, the user modules 62 may be attached to the headboard 52, footboard 54, and/or side rails 44, 46, 48, 50, or at any other suitable location, via fasteners, welding, snap-fit connections, or the like. In some versions, each user module 62 comprises a separate housing fixed to the headboard 52, footboard 54, and/or side rails 44, 46, 48, 50, or other suitable locations. In other versions, the housings of the user modules 62 are integrated into the headboard 52, footboard 54, and/or side rails 44, 46, 48, 50. In at least one embodiment, one of the user modules 62 is attached to the footboard 54 of the patient support apparatus 30 and other user modules 62 are attached to one or more of the side rails 44, 46, 48, 50. The user module 62 attached to the footboard 54 shall be described in detail, but the features and functions to be described are equally applicable to the other user modules 62 that may be located elsewhere on the patient support apparatus 30.

The user module 62 may communicate states of monitored conditions of the patient support apparatus 30 and/or the patient, or other information, to a caregiver. For example, the user module 62 may be configured to provide a caregiver with information about the states of monitored conditions such as bed occupancy, side rail positions, head-of-bed (HOB) angle, bed height, power source condition, brakes condition, and the like. In some embodiments, each of the monitored conditions has two states, but more states are also possible. The user module 62 employs a plurality of visual indicators, described further below, to communicate the states of the monitored conditions to the caregiver. In some cases, the visual indicators are inactive (off) in one state and active (on) in another state. In some cases, the visual indicators are activated/illuminated in a first color in one state and activated/illuminated in a second color, different than the first color, in another state. The first and second colors may be any color, such as green, blue, amber, yellow, orange, red, etc. In some cases, the first color indicates a desired state of the monitored condition and the second color indicates an undesired state of the monitored condition. Examples of some of the states and associated activation/illumination of the visual indicators to be communicated to the caregiver are shown in the chart below. It should be appreciated that these are merely examples and many variations are possible.

| Condition | Condition States | Indicator Activation |
|---|---|---|
| Bed Occupancy | 1: Patient sensed | 1: Active-first color |
|  | 2: Patient not sensed | 2: Active-second color |
| Side Rail Position | 1: Up | 1: Active-first color |
|  | 2: Down | 2: Active-second color |
| HOB Angle | 1: 30 degrees or above | 1: Active-first color |
|  | 2: Less than 30 degrees | 2: Active-second color |
| Bed Height | 1: Above lowest height | 1: Inactive |
|  | 2: At lowest height | 2: Active-first color |
| Power Source | 1: Plugged in | 1: Inactive |
|  | 2: Not plugged in | 2: Active-second color |
| Brakes | 1: Brakes on | 1: Inactive |
|  | 2: Brakes off | 2: Active-second color |

Figure 2:
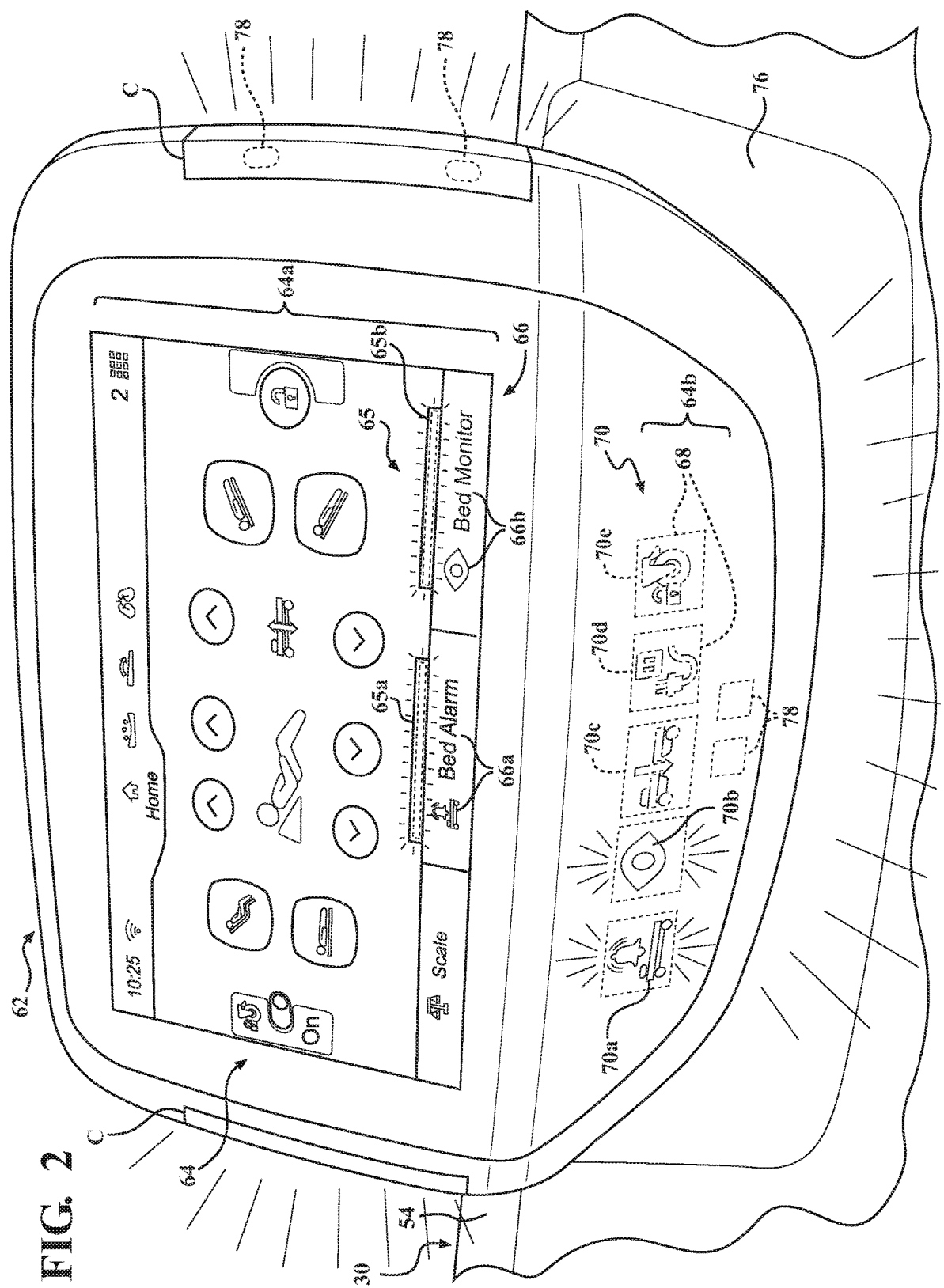
FIG. 2 is a partial perspective view of the user module depicted in FIG. 1.

FIG. 2 depicts a perspective view of the user module 62 attached to the footboard 54. The user module 62 may include a user interface 64 having a display 64a. The user interface 64 may be a touchscreen-type. The display 64a may be controlled to display one or more visual indicators, such as state indicators 65 and associated indicia 66. The state indicators 65 and associated indicia 66 indicate the current states of the monitored conditions to the caregiver on the display 64a. For example, referring to the chart above, the state indicators 65 may be inactive in one state and active in another state, may be generated on the display 64a in the first color in one state and in the second color in another state, or may otherwise change to indicate the current states of the monitored conditions. The state indicators 65 may employ text or graphics, or other forms of visual content, to indicate the current states of the monitored conditions.

As shown in FIG. 2, in one embodiment, the state indicators 65 may comprise light bars along the top of their associated indicia 66. In the illustrated example, a first state indicator 65a is associated with bed occupancy, which is represented on the display 64a by first indicium 66a (e.g., text "Bed Alarm" and associated graphical symbol of an alarm over a bed). The first indicium 66a may remain displayed in black and white (or other colors), while the light bar of the first state indicator 65a is activated in the first color or the second color to indicate the current state of the bed occupancy condition, e.g., either patient sensed on the patient support apparatus 30 (first color) or not sensed on the patient support apparatus 30 (second color). Additionally, or alternatively, the first indicium 66a may be illuminated on the display 64a in the first color or the second color. In FIG. 2, for example, the first state indicator 65a is illuminated in green to indicate that the patient is sensed on the patient support apparatus 30. The display 64a may comprise an LED display, OLED display, or the like, capable of generating images associated with the state indicators 65 and the associated indicia 66, and capable of changing appearances of the state indicators 65 and/or associated indicia 66 to indicate current states of the monitored conditions.

As also shown in FIG. 2, two or more monitored conditions and their associated states may be represented by a second state indicator 65b and associated second indicium 66b (e.g., text "Bed Monitor" and associated graphical symbol of an eye). Prior to use, the caregiver or other user may select, using the user interface 64, the two or more monitored conditions to be associated with the second state indicator 65b and may also set desired states of the selected monitored conditions. For example, the caregiver may select all of the following monitored conditions to be associated with the second state indicator 65b: bed occupancy; side rail positions; head-of-bed (HOB) angle; bed height; and brake conditions. Accordingly, if these monitored conditions are all initially set in their desired states, and subsequently any one of these monitored conditions changes to an undesired state, then the light bar of the second state indicator 65b above the second indicium 66b changes to generally indicate an undesirable state, such as changing from inactive to active, changing from the first color to the second color, or the like. In FIG. 2, for example, the second state indicator 65b is illuminated in red to indicate that one of the monitored conditions associated with the second state indicator 65b is in an undesired state.

Additionally, the user module 62 may include an indicator panel 64b (also referred to as a dashboard) to additionally communicate the current states of the monitored conditions to a caregiver. The indicator panel 64b comprises a plurality of indicia 70, each of which may be associated with a different monitored condition. For example, a first indicium 70a (e.g., a graphical symbol of an alarm over a bed) may be associated with bed occupancy, a second indicium 70b (e.g., a graphical symbol of an eye) may be associated with two or more conditions as previously described, a third indicium 70c (e.g., a graphical symbol of an arrow and bed) may be associated with bed height, a fourth indicium 70d (e.g., a graphical symbol of an unplugged AC power cord) may be associated with the power source condition, and a fifth indicium 70e (e.g., a graphical symbol of a lock and wheel) may be associated with the brakes condition. The plurality of indicia 70 may include more or less than the indicium 70a, 70b, 70c, 70d, 70e, and be associated with more or less monitored conditions. The plurality of indicia 70 may be dead-fronted on the indicator panel 64b of the user module 62 such that the plurality of indicia 70 may only be visible by the caregiver when illuminated by first light emitters 68 supported in the housing of the user module 62. The first light emitters 68 are positioned behind the plurality of indicia 70 to illuminate the indicia 70 when activated. Alternatively, the plurality of indicia 70 may be formed as cutouts/openings in the indicator panel 64b to allow light from the first light emitters 68 to pass therethrough.

Each indicium 70a, 70b, 70c, 70d, 70e of the plurality of indicia 70 may be activated/illuminated via the first light emitters 68 to thereby act as visual indicators that indicate the current states of the monitored conditions. For example, illuminating the plurality of indicia 70 in the first color or the second color allows the user module 62 to quickly and effectively convey relevant information about the patient support apparatus 30 and/or the patient to the caregiver. The plurality of indicia 70 may also illuminate in a color that matches a color of their corresponding state indicator 65, such that the light emitters 68 and associated plurality of indicia 70 collectively act as redundant visual indicators. Matching colors between the light emitters 68/plurality of indicia 70 and the state indicators 65 provides immediate information to a caregiver regarding the states of the monitored conditions. For example, as shown in FIG. 2, the first indicium 70a may be illuminated by one of the first light emitters 68 in a green color matching the green color of the corresponding state indicator 65a to indicate that the bed occupancy condition is in a desired or satisfactory state (e.g., the patient is on the patient support apparatus 30). Likewise, the second indicium 70b may be illuminated in a red color matching the red color of the state indicator 65b to indicate that at least one of the monitored conditions associated with the second indicium 70b is in an undesired or unsatisfactory state. While described as green and red, other colors, such as blue, yellow, amber, orange, or others, may be employed to indicate various states of the monitored conditions. In addition, while green may indicate desired states and red, orange, or amber may indicate undesired states in some versions, other colors may be used to indicate desired and/or undesired states, or any other states of the monitored conditions. Additionally, or alternatively, any of the plurality of indicia 70 and/or the state indicators 65 may be illuminated at various frequencies and with various color changes to further indicate the current states of the monitored conditions.

Still referring to FIG. 2, one or more reflective surfaces 76 may be located on the patient support apparatus 30 proximate the user module 62. The reflective surfaces 76 may be disposed relative to the user module 62 such that one or more second light emitters 78 supported by the housing of the user module 62 project light away from the user module 62 toward the reflective surfaces 76 to be reflected off the reflective surfaces 76 and outward from the patient support apparatus 30 to act as another visual indicator. The second light emitters 78 may be located on a bottom of the housing of the user module 62 to project the light away from the bottom of the housing toward the reflective surfaces 76. Accordingly, the second light emitters 78 may be hidden from view by the housing. The light may be reflected, for example, in several directions, including generally horizontal directions, for being easily viewed by a caregiver at a distance from the patient support apparatus 30. As shown in FIG. 2, in one example, one of the reflective surfaces 76 is disposed underneath the user module 62 to reflect light away from the patient support apparatus 30. The reflective surface 76 may be a surface of the footboard 54, or may be any surface capable of reflecting light from the second light emitters 78, and may be present elsewhere on the patient support apparatus 30. Similar reflective surfaces 76 may be present on the headboard 52 and/or one or more of the side rails 44, 46, 48, 50 to reflect light from other user modules 62.

The second light emitters 78 may be configured to project light in a reflected color matching the color projecting from one of the indicia 70 and matching the color of one of the state indicators 65. For example, if the first indicium 70a and the first state indicator 65a related to the first indicium 70a are activated/illuminated in green, one or more of the second light emitters 78 project green light off the reflective surface 76 to indicate that the bed occupancy condition is in a desired state. Likewise, if the second indicium 70b and the second state indicator 65b related to the second indicium 70b are activated/illuminated in red, one or more of the second light emitters 78 project red light off the reflective surface 76. Reflecting light off the reflective surface 76 allows a caregiver to monitor the conditions of the patient support apparatus 30 and/or the patient from a distance, without having to be adjacent to the display 64a. This further allows for convenient and efficient information transfer to the caregiver. The second light emitters 78 may be configured to project light off the reflective surface 76 consistent with each indicium 70a, 70b, 70c, 70d, 70e of the plurality of indicia 70. For example, different colors of light may be projected in a sequential fashion or intermittently to indicate the current states of each of the monitored conditions. Alternatively, one or more of the second light emitters 78 may be controlled to illuminate the reflective surface 76 in a color that indicates a desired state if all of the monitored conditions are in their desired states and to illuminate the reflective surface 76 in a different color that indicates an undesired state if any of the monitored conditions is in an undesired state, even if one or more monitored conditions remain in a desired state.

The state indicators 65 and the first and second light emitters 68, 78 may be configured to emit/project light constantly, in which colors corresponding to the current states of the monitored conditions are emitted/projected without interruption, or light may be emitted/projected intermittently, in which the colors are emitted/projected at a frequency such that the light is emitted/projected on and off according to a set schedule, and flashes or blinks. Likewise, the state indicators 65 and the first and second light emitters 68, 78 may be configured to emit/project light both constantly and intermittently. Using the example above, the first state indicator 65a and the first indicium 70a may be intermittently illuminated green while the second state indicator 65b and the second indicium 70b may be intermittently illuminated red. Simultaneously, one or more of the second light emitters 78 may intermittently emit/project green and/or red light off the reflective surface 76. A frequency of the intermittent light emission/projection of the state indicators 65, the first light emitters 68, and/or the second light emitters 78 may be defined by the nature of the monitored condition. For example, if a current state of one monitored condition is undesired and demands urgent attention, intermittent flashing of light may be at a higher frequency than that used to indicate an undesired state of another monitored condition that does not demand urgent attention.

The first light emitters 68 and/or the second light emitters 78 may comprise RGB LEDs ("Red-Green-Blue Light Emitting Diodes"). The first light emitters 68 and/or the second light emitters 78 may comprise a single RGB LED, or may comprise a plurality of LEDs. The first and second light emitters 68, 78 may also comprise one or more incandescent bulbs, halogen lamps, neon lamps, fluorescent tubes, and/or any other types of light emitting devices. Some of the light emitters 78 may be located on the sides of the user module 62 to illuminate through light-transmitting covers C attached to the housing of the user module 62.

Figure 3:
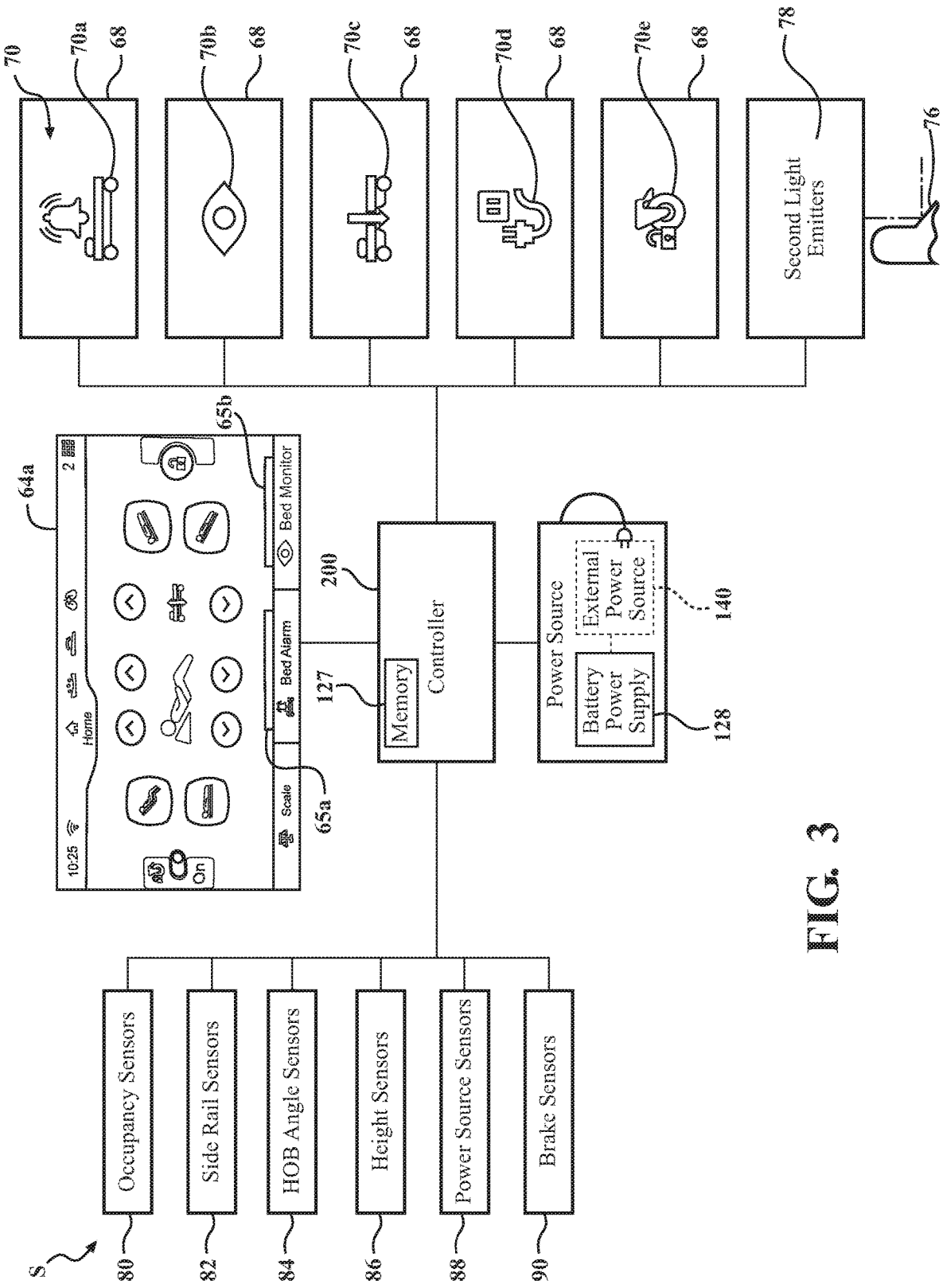
FIG. 3 is a schematic diagram of a control system for the user module depicted in FIGS. 1 and 2.

Referring to FIG. 3, a control system is provided to control operation of the display 64a, and the first and second light emitters 68, 78 to control activation/illumination of the state indicators 65 and activation/illumination of the indicia 70 and the light from the reflective surfaces 76. The control system comprises a controller 200 having one or more microprocessors, microcontrollers, field programmable gate arrays, systems on a chip, discrete circuitry, and/or other suitable hardware, software, or firmware that is capable of carrying out the functions described herein. The controller 200 may be carried on-board the patient support apparatus 30, or may be remotely located. In one embodiment, the controller 200 is mounted to the base 34. In other embodiments, the controller 200 is mounted to the footboard 54, and may be part of the user module 62. Power to the display 64a, the first and second light emitters 68, 78 and/or the controller 200 may be provided by a battery power supply 128 and/or an external power source 140. The controller 200 is coupled to the display 64a and the first and second light emitters 68, 78 in a manner that allows the controller 200 to control the display 64a and the first and second light emitters 68, 78 (connections shown schematically in FIG. 3). The controller 200 may communicate with the display 64a and the first and second light emitters 68, 78 via wired or wireless connections to perform the functions described herein.

The controller 200 is configured to process instructions or an algorithm stored in memory 127 to control operation of the display 64a and the first and second light emitters 68, 78 to control activation/illumination, e.g., by controlling a frequency and/or color of light emitted/projected from the display 64a, the first light emitters 68, and/or the second light emitters 78. The controller 200 also controls operation of the display 64a and the first and second light emitters 68, 78 to illuminate the state indicators 65, the plurality of indicia 70, and the reflective surfaces 76 so that the color of light and/or the frequency of illumination used for each monitored condition matches. For example, the second state indicator 65b may be illuminated in red and blink at a first frequency, while one or more of the first light emitters 68 intermittently illuminates the second indicium 70b in red at the same first frequency, and one or more of the second light emitters 78 illuminates the reflective surface 78 in red at the same first frequency. The controller 200 may also delay activation/illumination of the state indicators 65, the plurality of indicia 70, and/or the reflective surface 76 in response to a change in state of one or more of the monitored conditions such that the user module 62 does not indicate an undesired state in response to a momentary change in state. For example, the caregiver may deactivate the brakes momentarily to adjust a position of the patient support apparatus 30, but then immediately reset the brakes back to being active. This process may take no more than 30 seconds or less. Accordingly, the controller 200 may monitor a time period once the state has changed and delay the associated notification of the state change until a predetermined period of time has elapsed. The predetermined period of time may be 5, 10, 15, 20, 25 seconds, or other predetermined period of time.

A sensor system S comprising one or more sensors 80, 82, 84, 86, 88, 90 is integrated into the patient support apparatus 30 to generate one or more input signals corresponding to the various states of the monitored conditions. The controller 200 generates output/command signals to control the display 64a and the first and second light emitters 68, 78 based on the input signals that the controller 200 receives from the sensors 80, 82, 84, 86, 88, 90 of the sensor system S. Thus, the sensor system S provides input to the controller 200 associated with the various states of the monitored conditions and the controller 200 outputs commands to control the display 64a and the first and second light emitters 68, 78 to indicate the states of the monitored conditions.

The sensor system S may include one or more bed occupancy sensors 80, side rail sensors 82, HOB angle sensors 84, height sensors 86, power source sensors 88, and brake sensors 90. The bed occupancy sensors 80 generate input signals that indicate a presence (or lack thereof) of a patient on the patient support apparatus 30, and may also be referred to as bed exit sensors or weight sensors. The side rail sensors 82 generate input signals that indicate a current position of one or more of the side rails 44, 46, 48, 50 so that the controller 200 can determine whether the side rails 44, 46, 48, 50 are in the raised position (up), lowered position (down), or in one of the intermediate positions. The HOB angle sensors 84 generate input signals that indicate a current angle of the back section 41 so that the controller 200 can determine whether the back section 41 is at 30 degrees or above relative to the support frame 36 or at less than 30 degrees. The height sensors 86 generate input signals that indicate a current height of the support frame 36/patient support deck 38 so that the controller 200 can determine whether the patient support apparatus 30 is at the lowest height or not. The power source sensors 88 generate input signals that indicate whether or not the AC power plug that provides power from the external power source 140 to the patient support apparatus 30 is plugged into a corresponding outlet (e.g., wall outlet) to receive external power. The brake sensors 90 generate input signals that indicate whether the brakes are active (on) or inactive (off). These sensors 80, 82, 84, 86, 88, 90 may include one or more load cells, pressure sensors such as piezoelectric and piezoresistive sensors, Hall Effect sensors, capacitive sensors, resonant sensors, thermal sensors, limit switches, gyroscopes, accelerometers, motion sensors, ultrasonic sensors, range sensors, potentiometers, magnetostrictive sensors, electrical current sensors, voltage detectors, and/or any other suitable types of sensors for carrying out their associated functions. When the sensor system S generates an input signal indicative of a state change, the controller 200 may cause activation/illumination of a respective state indicator 65, indicium 70a, 70b, 70c, 70d, 70e, and/or reflective surface 76 in the manner described herein.

Figure 4:
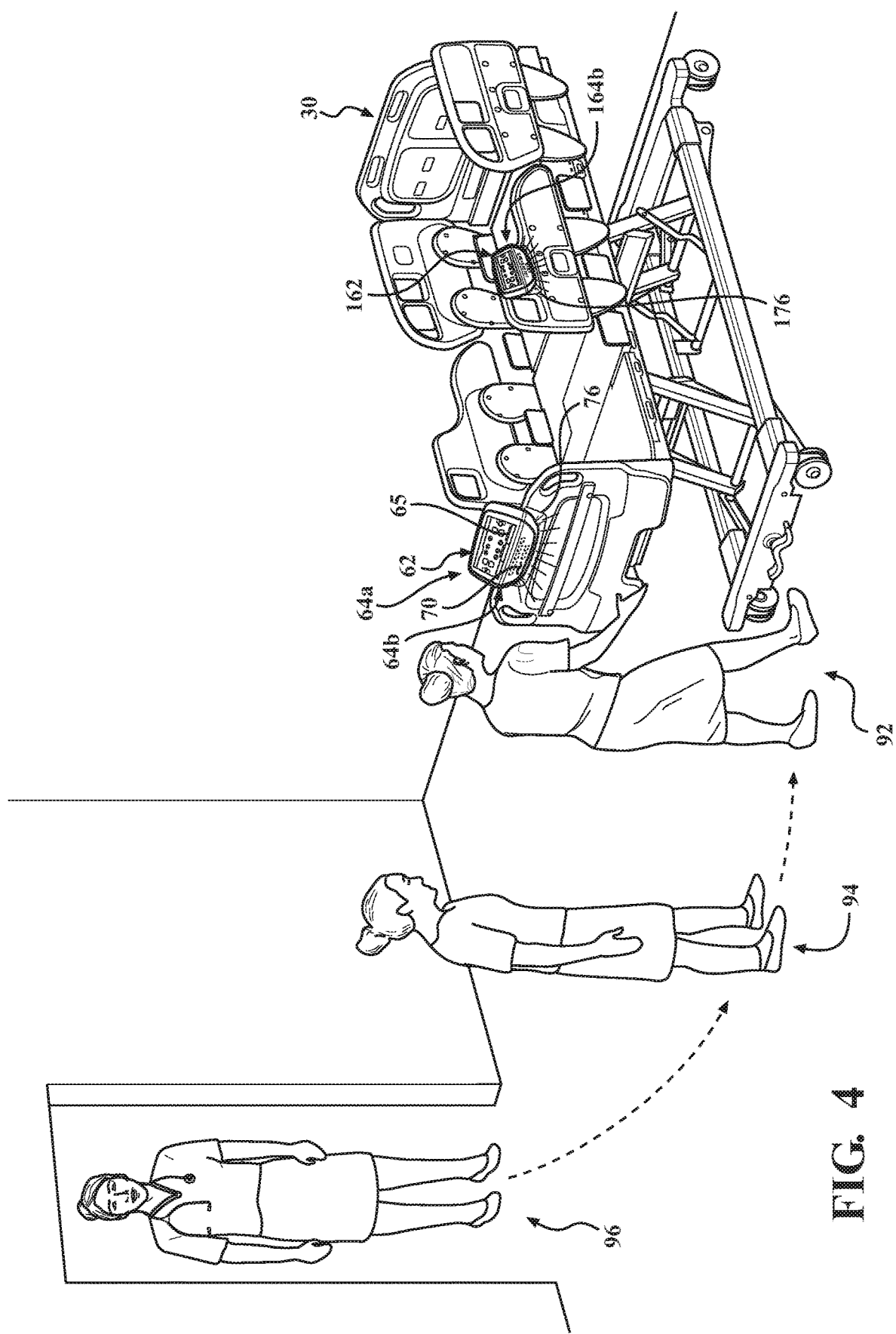
FIG. 4 is a perspective view of a room with the patient support apparatus having the user module being viewed by a caregiver when the caregiver is in various locations.

FIG. 4 depicts a perspective view of a caregiver at various locations 92, 94, 96 with respect to a patient room in which the patient support apparatus 30 is located. As described above, the user module 62 allows the caregiver to effectively and efficiently receive information about the patient support apparatus 30 and/or the patient at a first location 92 adjacent to the user module 62, at a second location 94 spaced from the user module 62, and/or at a third location 96 remote from the user module 62. For example, if the caregiver is in the third location 96, remote from the user module 62, such as just outside the patient room, the light projecting off the reflective surface 76 via the one or more second light emitters 78, as described above, is visible to the caregiver, and provides a general indication to the caregiver of the status of the patient support apparatus 30 and/or the patient. However, the display 64a and the indicator panel 64b may be more difficult to see from the third location 96.

If further inquiry by the caregiver is required based on the nature of the light projecting from the reflective surface 76 (e.g., the light is red, orange, or amber), the caregiver may move to the second location 94 spaced from the user module 62 to check the plurality of indicia 70 that may be illuminated by the first light emitters 68 to get a better sense of the current states of one or more of the monitored conditions. The second location 94 could be, for example, a radius of from 2 to 20 feet, from 2 to 15 feet, from 2 to 10 feet, or the like, from any portion of the user module 62. Again, if further inquiry is still required based on the illumination of the plurality of indicia 70 by the first light emitters 68, the caregiver may move to the first location 92 adjacent the user module 62. The first location 92 enables the caregiver to view the state indicators 65 for each of the monitored conditions, and, in some case, enables the caregiver to make further inquiry via the user interface 64. Therefore, the user module 62 provides efficient communication about the state of the patient support apparatus 30 and/or the patient in stages such that the caregiver may not need to enter the patient room.

In some embodiments, additional user modules 162 may be present on the patient support apparatus 30, spaced from the user module 62. See, for example, the user module 162 located on one of the side rails in FIG. 4 (a similar user module 162 may be located on an opposing side rail). These user modules 162 may have more or less functionality than the user module 62, and may have their own indicator panels 164b with associated indicia 70 and/or reflective surfaces 176 to project light outward from the side rails, for example. In these embodiments, the user module 162 operates via its own first light emitters and/or second light emitters in the same manner as the user module 62, and may be coordinated to display the respective colors and/or in the same frequencies as the user module 62 so that all the user modules 62, 162 communicate the states of the monitored conditions in a uniform manner. As previously described, multiple user modules 62, 162 may also be located elsewhere around the patient support apparatus 30 and may operate in a coordinated manner as described herein.

Figure 5:
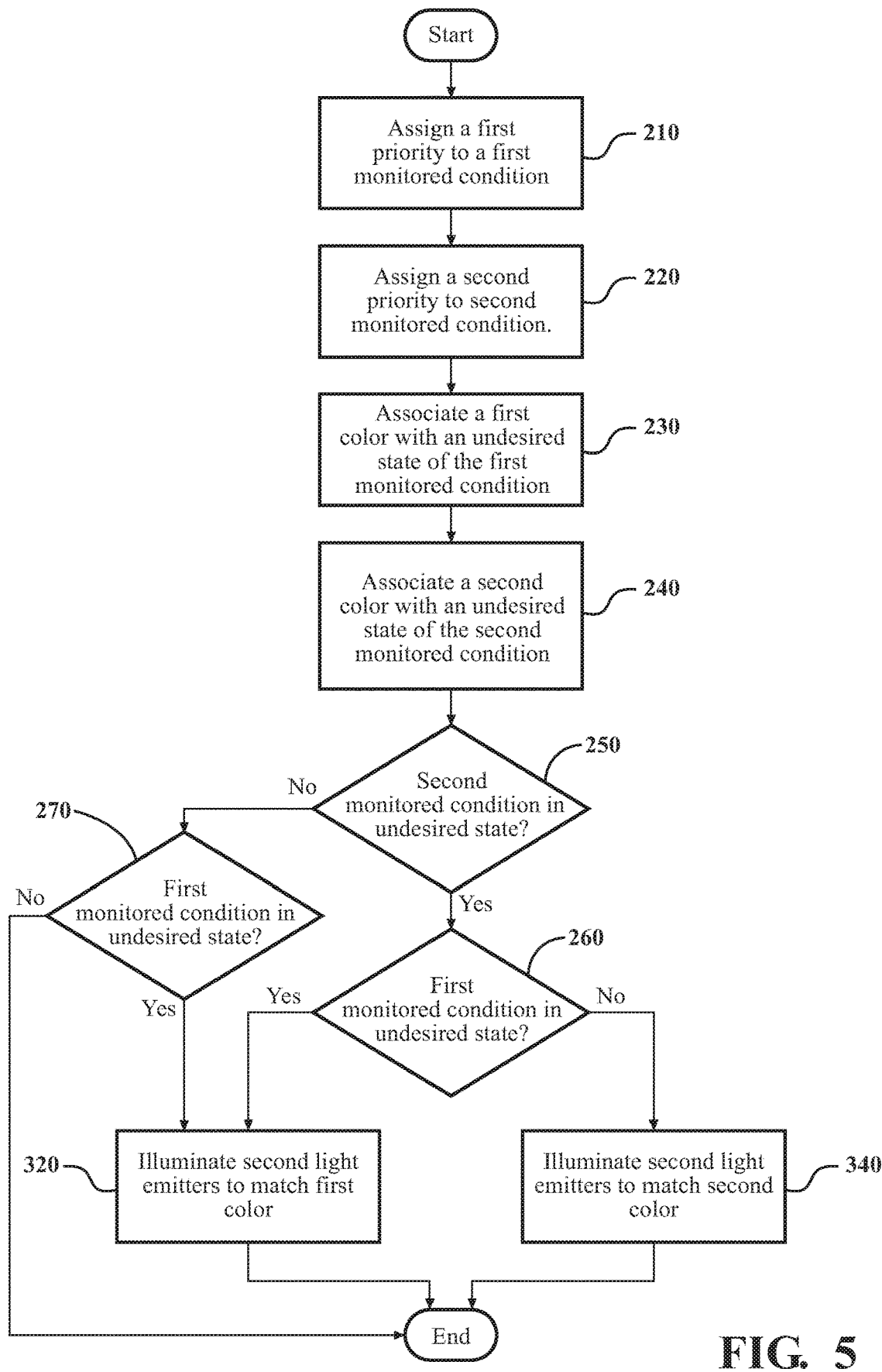
FIG. 5 is a flow diagram of sample steps used in one method to assign priorities to monitored conditions.

In some embodiments, only a single color of light may be reflected off the reflective surfaces 76, 176 at a given time. Accordingly, by default, if any of the monitored conditions is in an undesired state, then the color of light reflected off the reflective surfaces 76, 176 corresponds to the color of light associated with that undesired state. However, two monitored conditions may be in undesired states simultaneously, and the colors associated with their undesired states may be different. For example, the undesired state of the bed occupancy condition may be indicated with red light, while the undesired state of the brakes condition may be indicated with amber light. FIG. 5 depicts a flow diagram indicative of sample steps performed by the controller 200 to determine the color of light to be reflected off the reflective surfaces 76, 176 based on priority assigned to the monitored conditions, e.g., to determine whether the light from the reflective surfaces 76, 176 should be red or amber, for example.

At step 210, a first priority is assigned to a first monitored condition, and at step 220, a second priority is assigned to a second monitored condition. The first priority and the second priority may be assigned/preset by the manufacturer in software operated by the controller 200 and/or may be selectable by the caregiver or other user, and may be stored in the memory 127 for retrieval by the controller 200 during operation. The first priority has a higher status/priority than the second priority and thus dictates which color of light is reflected off the reflective surfaces 76, 176.

At step 230, a first color is associated with an undesired state of the first monitored condition, and at step 240, a second color is associated with an undesired state of the second monitored condition. The first color and the second color may be assigned/preset by the manufacturer in software operated by the controller 200 and/or may be selectable by the caregiver or other user, and may be stored in the memory 127 for retrieval by the controller 200 during operation. Since the first priority is higher than the second priority, if both of the first and second monitored conditions are in an undesired state simultaneously, then the first color is projected. Accordingly, at steps 250, 260, and 270, the controller 200 determines which, if any, of the first and second monitored conditions is in an undesired state, and commands the second light emitters 78 accordingly, as shown at steps 320, 340.

Matching color based on priority allows the controller 200 to communicate a current state of the patient support apparatus 30 and/or the patient to a caregiver at the third location 96 remote from the user module 62 via the one or more second light emitters 78. Therefore, a caregiver may quickly and efficiently check a general state of the patient support apparatus 30 and/or the patient, and decide if further inquiry of the user module 62 is required.

While exemplary embodiments have been described above, one with ordinary skill in the art will readily determine that other components, devices, hardware or software may be used in conjunction with, in addition to, or instead of the examples described above. One having ordinary skill in the art will also readily appreciate substitution of known elements for other known elements that accomplish the tasks outlined above.

The invention claimed is:

1. A patient support apparatus comprising:
a support structure having a patient support surface;
a user module operatively attached to the support structure and including a user interface having a display supported for viewing by a user when adjacent to the support structure;
an indicator panel having a plurality of indicia associated with monitored conditions;
a plurality of first light emitters, with each first light emitter arranged behind one of the plurality of indicia to project light to illuminate the respective indicia, wherein at least one of the plurality of first light emitters is configured to project light in at least a first color and a second color different from the first color; and
a controller coupled to the user interface and the plurality of first light emitters, the controller being configured to:
activate one or more of the plurality of first light emitters to project light in the first color to illuminate one of the plurality of indicia associated with a respective monitored condition,
generate a state indicator on the display corresponding to the respective monitored condition with the state indicator being generated in the first color so that the state indicator matches the first color of light projected by the one or more of the plurality of first light emitters corresponding to the respective monitored condition, and
in response to a change in a state of one of the monitored conditions:
activate the one or more of the plurality of first light emitters to project light in the second color to illuminate the indicium associated with the respective monitored condition, and
generate the state indicator on the display corresponding to the respective monitored condition with the state indicator being generated in the second color so that the state indicator matches the second color of light projected by the one or more of the plurality of first light emitters corresponding to the respective monitored condition.

2. The patient support apparatus of claim 1, further comprising
a reflective surface coupled to the support structure and spaced from the user module.

3. The patient support apparatus of claim 2, further comprising at least one of a footboard and a side rail coupled to the support structure, the at least one of the footboard and the side rail having the reflective surface.

4. The patient support apparatus of claim 2, further comprising one or more second light emitters supported by the user module and arranged to project light away from the user module and against the reflective surface to illuminate the reflective surface in a reflected color that matches the color of the light projected by one or more of the plurality of first light emitters and the color of the state indicator, the controller being configured to, in response to the change in the state of the one of the monitored conditions, activate the one or more second light emitters to project the light against the reflective surface to illuminate the reflective surface in the reflected color that matches the color of the light projected by one or more of the plurality first light emitters to illuminate the respective indicia and the color of the state indicator of the monitored condition on the display.

5. The patient support apparatus of claim 4, wherein the controller is configured to, in response to the change in the state of the one of the monitored conditions, delay generating the state indicator on the display, delay activating one or more of the plurality of first light emitters, and delay activating the one or more second light emitters, until a predetermined period of time has elapsed after the change in the state.

6. The patient support apparatus of claim 4, wherein the controller is configured to, in response to the change in the state of the one of the monitored conditions, intermittently generate the state indicator on the display, intermittently activate one or more of the plurality of first light emitters, and intermittently activate the one or more second light emitters, such that the state indicator, the light projected by one or more of the plurality of first light emitters, and the light projected by the one or more second light emitters are coordinated to flash at a predetermined frequency.

7. The patient support apparatus of claim 1, further comprising a sensor system coupled to the controller to determine current states of the monitored conditions.

8. The patient support apparatus of claim 7, wherein the sensor system comprises one or more sensors.

9. The patient support apparatus of claim 7, wherein the one of the monitored conditions is associated with occupancy of the patient support apparatus by a patient.

10. The patient support apparatus of claim 7, further comprising one or more side rails coupled to the support structure, wherein the one of the monitored conditions is associated with a side rail position of the one or more side rails.

11. The patient support apparatus of claim 7, wherein the support structure comprises a support frame and a patient support deck having a back section capable of articulating relative to the support frame, wherein the one of the monitored conditions is associated with an angle of the back section relative to the support frame.

12. The patient support apparatus of claim 7, further comprising a lift system coupled to the support structure to raise and lower the patient support surface, wherein the one of the monitored conditions is associated with a height of the patient support surface.

13. The patient support apparatus of claim 7, further comprising an AC power plug configured to plug into an external power source, wherein the one of the monitored conditions is associated with the AC power plug.

14. The patient support apparatus of claim 7, further comprising wheels coupled to the support structure and one or more brakes associated with the wheels, wherein the one of the monitored conditions is associated with the one or more brakes.

15. The patient support apparatus of claim 1, wherein the plurality of indicia comprise graphical symbols associated with the monitored conditions.

16. The patient support apparatus of claim 1, wherein the indicator panel is integral with the user interface to form a first user module coupled to the support structure.

17. The patient support apparatus of claim 16, further comprising a second user module coupled to the support structure, spaced from the first user module, to indicate the change in the state of the one of the monitored conditions.

18. The patient support apparatus of claim 4, wherein the plurality of indicia include a first indicium associated with a first monitored condition and a second indicium associated with a second monitored condition, the first monitored condition being assigned a first priority and the second monitored condition being assigned a second priority, different than the first priority;
- wherein one of the plurality of first light emitters is arranged behind the first indicium to project light to illuminate the first indicium in a first color, and with another of the plurality of first light emitters is arranged behind the second indicium to illuminate the second indicium in a second color, different than the first color; and
- wherein the controller configured to control the one or more second light emitters so that the reflected color projected by the one or more second light emitters matches one of the first and second colors of the plurality of first light emitters based the assigned priorities.

* * * * *